June 17, 1952  H. E. KIMES  2,600,506
METALLIC INSERT FOR PNEUMATIC TIRES
Filed Dec. 21, 1948
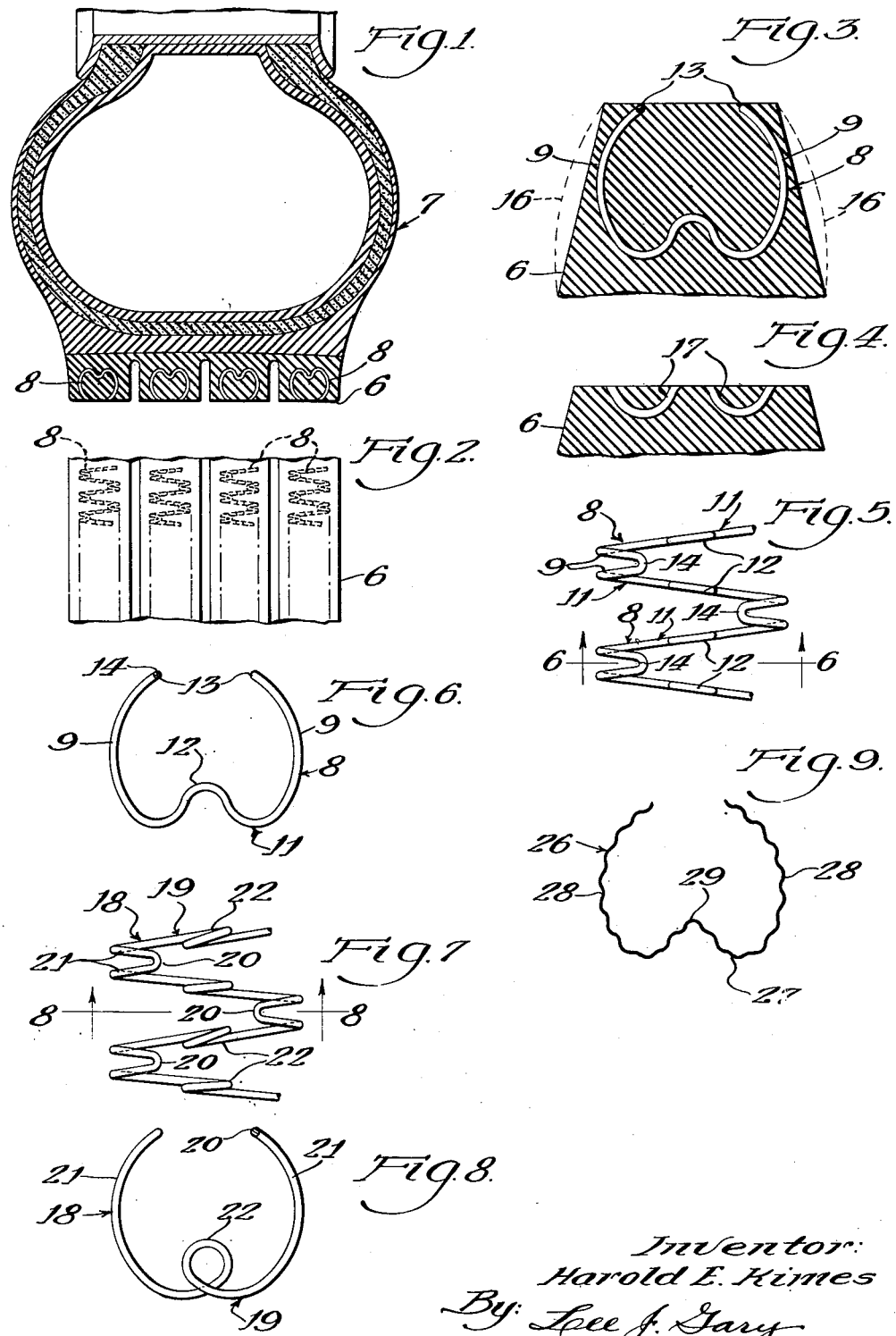
Inventor:
Harold E. Kimes
By: Lee J. Gary
Attorney Patented June 17, 1952

2,600,506

UNITED STATES PATENT OFFICE 2,600,506

METALLIC INSERT FOR PNEUMATIC TIRES

Harold E. Kimes, Chicago, Ill., assignor to Harold E. Kimes Corporation, Chicago, Ill., a corporation of Illinois Application December 21, 1948, Serial No. 66,437

16 Claims. (Cl. 152—211)

This invention relates to an improved type of metallic insert adapted to be imbedded within the tread portion of pneumatic tires for the purpose of reducing punctures or skidding.

Various types of forms of metallic inserts have heretofore been incorporated within the tread portion of pneumatic tire casings for the purpose of reducing punctures and skidding. One type of metallic insert which has been employed for use in the tread portion of pneumatic tires consists of a helically wound high carbon steel wire providing a plurality of connected coils, the crown of each coil being worn away during use of the tire to provide individual U-shape members having sharp ends which project through the tire tread for engagement with a road surface. A metallic insert formed of helically wound wire is disclosed in Patent No. 1,740,616, and this patent further specifies that the tire tread may be provided with individual U-shape clips in place of the helically wound wire. In practicing the invention disclosed in Patent 1,740,616, it will be noted that the metallic insert formed of helically wound wire must be broken at the crown of each coil before it is operative to prevent skidding, thereby requiring a tire travel of hundreds of miles before the metallic insert provides antiskid properties for the tread. As set forth in Patent 1,740,616 the use of individual U-shape clips greatly increases the cost of manufacture of the tire.

The present invention contemplates the provision of a metallic insert comprising a high carbon steel wire formed to provide a plurality of U-shape clip portions connected together at the ends of their arms to provide relatively sharp points for projection through the tread portion of a tire casing for contact with the road surface. After a tire equipped with the present type of metallic insert has travelled for a relatively short distance, the junctures of the U-shape clip members is broken to provide individual, separated U-shape clips having sharp ends to project through the tire tread for engagement with the road surface.

This invention further contemplates the provision of a U-shape metallic insert formed with a curvilinear base, the medial portion of the base projecting upwardly between the arms of the U-shape insert, whereby wear of the arms and subsequent wear of the medial portion of the base eventually results in the division of the metallic insert into two relatively small particles of metal which are not of sufficient size to be forced through and puncture a tire casing.

This invention further contemplates the provision of a metallic insert comprising a plurality of U-shape clips connected together at the ends of their arms and formed with a loop portion at their bases whereby wear of the arms and subsequent wear of the loop portion of the base eventually results in division of each U-shape metallic insert into two relatively small particles of metal.

This invention further contemplates the provision of metallic inserts which may be formed from high carbon steel strip material. When the metallic insert is formed from narrow strip steel, the arms and base of each U-shape metallic insert is crinkled, or formed with reverse curves, to provide maximum engagement with the rubber of the tire tread.

This invention embodies other novel features, details of construction and arrangement of parts, which are hereinafter set forth in the specification and claims, and illustrated in the accompanying drawing wherein:

Fig. 1 is a transverse sectional view illustrating the manner of mounting a metallic insert within the tread portion of a pneumatic tire casing.

Fig. 2 is a detail fragmentary plan view of the tread portion of a tire casing, showing the metallic inserts imbedded therein.

Fig. 3 is an enlarged transverse sectional view illustrating the manner in which a U-shape metallic insert is imbedded within the tread portion of a new tire casing.

Fig. 4 is an enlarged transverse sectional view, corresponding to Fig. 3, illustrating the manner in which the tread portion and metallic insert is worn away during use of the tire casing.

Fig. 5 is an enlarged detail plan view illustrating one form of metallic insert.

Fig. 6 is a transverse sectional view taken along the line 6—6 of Fig. 5.

Fig. 7 is an enlarged plan view illustrating another form of metallic insert.

Fig. 8 is a transverse sectional view taken along the line 8—8 of Fig. 7.

Fig. 9 is an enlarged transverse sectional view illustrating another modified form of metallic insert.

Referring now to the drawing for a better understanding of this invention and more particularly to Figs. 1 through 6 therein, one form of metallic insert adapted to be incorporated within the tread portion 6 of a pneumatic tire casing 7 is shown as comprising a length of high carbon steel wire bent to form a plurality of U-shape metallic inserts 8 which are preferably connected together at the ends of their arms 9—9 and arranged in the manner illustrated in Figs. 1, 2, 5 and 6 in the drawing. Each U-shape metallic insert 8 comprises a curvilinear base 11 having a pair of curvilinear arms 9—9 extending upwardly therefrom. The medial portion of the base 11 is bowed upwardly at 12 between the arms 9—9; and the arms 9—9 are preferably bowed outwardly from the base 11 to their upper ends 13—13. In forming the metallic inserts 8 from a continuous length of wire, the ends 13 of the arms 9 of each U-shape insert are connected to the ends of the arms 9 of adjacent U-shape metallic inserts, as illustrated at 14 in Fig. 5 of the drawing. However, it is contemplated that each U-shape metallic insert 8 may be formed as a separate unit and unattached to adjacent inserts within a tire 7.

The U-shaped metallic inserts 8 are imbedded within the tread portion 6 of a pneumatic tire casing 7 during manufacture of the casing, as illustrated in Fig. 3, with the ends of the arms 9 extending radially through the tread to terminate adjacent the periphery of the tread. As the tread of a tire casing embodying the metallic inserts is engaged against the surface of a road, compression of the tread due to applying the brakes of a car or in turning corners causes the ends of the arms 9 to project outwardly through the periphery of the tread and to dig into the surface of a road. During normal operation of a car, the ends of the arms 9—9 remain substantially flush with the periphery of the tread. During compression of the tread portion of a tire casing, the rubber tends to expand laterally as illustrated in dotted outline at 16 in Fig. 3, and it is, therefore, desirable to bow the arms 9—9 outwardly to permit further bowing action of the arms during compression of the tread. In other words, it is desirable to form the arms 9—9 so that they will follow the flow of the rubber during compression and expansion of the tread to prevent the metallic inserts from working loose from the tread and being ejected from the casing.

As the tread of a tire casing becomes worn, the ends of the arms 9—9 of the inserts 8 are gradually worn away, as illustrated in Fig. 4. Eventually, wear of the tire tread causes the medial portion 12 of the inserts to be worn away, thus causing the inserts to be divided into two relatively small arcuate-shape pieces of metal indicated at 17. It will be noted that particles of metal, as illustrated at 17 in Fig. 4, are not of sufficient size to be pressed through and puncture a tire casing. It is desirable that the metallic inserts 8 should be provided with a curvilinear base 11 which is free from sharp corners which might be pressed through the tire casing or which might tend to break the arms 9—9 from the base 11 during flexing movement of the arms as the tread portion of the casing is compressed and expanded.

Figs. 7 and 8 illustrate a modified form of this invention in which each metallic insert 18 comprises a curvilinear base 19, and a pair of arms 21—21 extending upwardly from the base. The medial portion of the base 19 is formed with a loop 22 extending upwardly between the arms 21—21. The metallic inserts 18 are preferably formed from a long length of high carbon steel wire, with the upper ends of the arms 21 of each insert 18 connected at 20 to the upper ends of the arms 21 of adjacent inserts. The U-shape metallic inserts 18 are imbedded within the tread of a tire casing in the manner heretofore described in connection with the first form of the invention illustrated in Figs. 1 through 6. As a tire tread becomes worn, the arms 21—21 are worn away and, eventually, the crown of the loop 22 is worn away to divide the base 19 into relatively small pieces of metal.

Fig. 9 in the drawing illustrates another modified form of this invention in which the metallic inserts 26 are formed from narrow strip steel to provide a curvilinear base 27 and a pair of arms 28—28 extending upwardly from the base. The base 27 is formed with a medial portion 29 extending upwardly for a short distance between the arms 28—28. The arms 28—28 and the base 27 are formed with a sinuous contour to provide improved surface contact with the rubber forming the tread. The sinuous contour also permits greater flexing action of the arms and base during compression and expansion of the rubber forming the tread. The inserts 26 are preferably formed from a relatively long length of strip material and joined to each other in the manner heretofore shown and described in connection with the preceding forms of this invention.

During the operation of a tire casing embodying metallic inserts of the types illustrated and described, it will be noted that the ends of the arms are normally disposed flush with the periphery of the tire tread but are adapted to project through the periphery of the tire tread during braking of a car. As the tire tread and arms become worn away, the medial portion of the base of the metallic insert also eventually becomes worn away to cause each U-shape metallic insert to be divided into relatively small particles of metal which are not of sufficient size to be forced through and puncture a tire casing.

While this invention has been shown in several forms, it is obvious to those skilled in the art that it is not so limited but is susceptible of various changes and modifications without departing from the spirit and scope of the claimed invention.

I claim as my invention:

1. A metallic insert for pneumatic tire treads, said insert being substantially U-shape and being adapted to be embedded in the tread of a tire with its plane generally normal to the circumference of the tire, said U-shaped insert having a curvilinear base and a pair of curvilinear arms projecting from said base, the medial portion of said base projecting reentrantly with respect to the U thus formed between said arms whereby wear of the arms and subsequent wear of the medial portion of said base eventually results in the division of said metallic insert into two relatively small pieces of metal extending substantially normal to the tread of the tire.

2. A metallic insert for pneumatic tire treads, said insert being substantially U-shape and being adapted to be embedded in the tread of a tire with its plane generally normal to the circumference of the tire, said U-shaped insert having a curvilinear base and a pair of arcuate arms projecting from said base, the medial portion of said base projecting reentrantly with respect to the U thus formed between said arms whereby wear of the arms and subsequent wear of the medial portion of said base eventually results in the division of said metallic insert into two relatively small pieces of metal of arcuate shape extending substantially normal to the tread of the tire.

3. A metallic insert for tire treads, said insert being substantially U-shape and being adapted to be embedded in the tread of a tire with its plane generally normal to the circumference of the tire, said U-shaped insert having a curvilinear base and a pair of arcuate arms projecting from said base, the medial portion of said base projecting reentrantly with respect to the U thus formed between said arms in the form of an inverted U whereby wear of the arms and subsequent wear of the medial portion of said base eventually results in the division of said metallic insert into two relatively small pieces of metal extending substantially normal to the tread of the tire.

4. A metallic insert for tire treads, said insert being formed substantially U-shape to provide a curvilinear base, and a pair of arcuate arms projecting upwardly from said base, the medial portion of said base projecting upwardly between said arms in the form of a loop whereby wear of the arms and subsequent wear of the medial portion of said base eventually results in the division of said metallic insert into two relatively small pieces of metal.

5. A chain of metallic inserts to be imbedded within a pneumatic tire tread, each insert being formed substantially U-shape to provide a curvilinear base, and a pair of arcuate arms projecting from said base, the medial portion of said base being crimped at a relatively sharp angle reentrantly between said arms whereby wear of the arms and subsequent wear of the medial portion of said base eventually results in the division of said metallic insert into two relatively small pieces of metal, said inserts being secured together at the ends of their arms in seriatim.

6. A chain of metallic inserts to be imbedded within a pneumatic tire tread, each insert being formed substantially U-shape to provide a curvilinear base, and a pair of curvilinear arms projecting upwardly from said base, the medial portion of said base projecting upwardly between said arms in the form of a loop whereby wear of the arms and subsequent wear of the medial portion of said base eventually results in the division of said metallic insert into two relatively small pieces of metal, said inserts being secured together at the ends of their arms.

7. In a pneumatic tire, an annular resilient rubber tread, a plurality of generally U-shape metallic inserts imbedded within said tread with their planes generally normal to the surface of said tread, each insert having a curvilinear base, and a pair of curvilinear arms projecting from said base and terminating substantially flush with the periphery of said tread, the medial portion of said base projecting reentrantly between said arms whereby wear of the tread and said arms and subsequent wear of the medial portion of said base eventually causes a division of said metallic insert into two relatively small pieces of metal having their ends disposed substantially normal to the surface of the tread.

8. In a pneumatic tire, an annular resilient rubber tread, a plurality of generally U-shape metallic inserts imbedded within said tread with their planes generally normal to the surface of said tread, each insert having a curvilinear base, and a pair of arcuate arms projecting from said base and having their ends terminating substantially flush with the periphery of said tread, the medial portion of said base projecting reentrantly between said arms whereby wear of the tread and said arms and subsequent wear of the medial portion of said base eventually causes a division of said metallic insert into two relatively small pieces of metal having their ends disposed substantially normal to the surface of the tread.

9. In a pneumatic tire, an annular resilient rubber tread, a plurality of generally U-shape metallic inserts imbedded within said tread, the plane of each insert being generally at right angles to the surface of the tread, each insert having a curvilinear base, and a pair of arcuate arms projecting from said base and having their ends terminating substantially flush with the periphery of said tread, the medial portion of said base projecting upwardly between said arms in the form of a loop whereby wear of the tread and said arms and subsequent wear of the medial portion of said base eventually causes a division of said metallic insert into two relatively small pieces of metal.

10. In a pneumatic tire, an annular resilient rubber tread, a chain of connected generally U-shape metallic inserts imbedded within said tread, the plane of each insert being generally at right angles to the surface of the tread, each insert having a curvilinear base, and a pair of curvilinear arms projecting from said base and having their ends terminating substantially flush with the periphery of said tread, the medial portion of said base being crimped and projecting reentrantly between said arms, the radius of curvature of said crimped portion being small relative to the radius of curvature of the tire section, whereby wear of the tread and said arms and subsequent wear of the medial portion of said base eventually causes a division of said metallic insert into two relatively small pieces of metal with their ends projecting transversely to the plane of the surface of the tread.

11. In a pneumatic tire, an annular resilient rubber tread, a chain of connected generally U-shape metallic inserts imbedded within said tread, each insert having a curvilinear base, and a pair of arcuate arms projecting upwardly from said base and terminating substantially flush with the periphery of said tread, the medial portion of said base being crimped and projecting reentrantly between said arms, the radius of curvature of said crimped portion being small relative to the radius of curvature of the tire section whereby wear of the tread and said arms and subsequent wear of the medial portion of said base eventually causes a division of said metallic insert into two relatively small pieces of metal with their ends projecting transversely to the plane of the surface of the tread.

12. In a pneumatic tire, an annular resilient rubber tread, a chain of generally U-shape metallic inserts imbedded within said tread, each insert having a curvilinear base, and a pair of arcuate arms projecting upwardly from said base and terminating substantially flush with the periphery of said tread, the medial portion of said base projecting upwardly between said arms whereby wear of the tread and said arms and subsequent wear of the medial portion of said base eventually causes a division of said metallic insert into two relatively small pieces of metal, said inserts being secured together at the ends of their arms, said inserts being angularly disposed with respect to adjacent inserts and being disposed substantially transversely to the tread surface.

13. In a pneumatic tire, an annular resilient rubber tread, a plurality of general U-shaped metallic inserts imbedded within said tread, each insert being former of a relatively elongated member of greater length than thickness or width and having a curvilinear base, and a pair of curvilinear arms projecting upwardly from said base, the ends of said arms terminating substantially flush with the periphery of said tread, the medial portion of said base projecting inwardly between said arms, the arms and inwardly projecting portion of each insert being disposed in a substantially common plane substantially radial with respect to said annular tread whereby wear of the tread and said arms and subsequent wear of the medial portion of said base eventually causes a division of said metallic insert into relatively small pieces of metal.

14. In a pneumatic tire, an annular resilient rubber tread, a chain of connected generally U-shape metallic inserts imbedded within said tread, each insert being formed of a relatively elongated member of greater length than thickness or width and having a curvilinear base, and a pair of curvilinear arms projecting from said base, the ends of said arms terminating substantially flush with the periphery of said tread, the medial portion of said base projecting inwardly between said arms, the arms and inwardly projecting portion of each insert being disposed in a substantially common plane substantially radial with respect to said annular tread whereby wear of the tread and said arms and subsequent wear of the medial portion of said base eventually causes a division of said metallic insert into relatively small pieces of metal.

15. A chain of metallic inserts adapted to be embedded in a pneumatic tire tread, each insert having a curvilinear base, and a pair of arms projecting from the ends of said base, a portion of said base projecting reentrantly between said arms, said reentrant portion having a small radius of curvature relative to the radius of curvature of a section of the tire whereby wear of the arms and subsequent wear of the reentrant projection of the base results in the division of said metallic inserts into relatively small pieces of metal, said inserts being secured together at the ends of their arms in seriatim.

16. A chain of metallic inserts adapted to be embedded in a pneumatic tire tread, each insert having a curvilinear base, and a pair of arms projecting from the ends of said base, a portion of said base projecting reentrantly between said arms, said reentrant portion having a small radius of curvature relative to the radius of curvature of a section of the tire whereby wear of the arms and subsequent wear of the reentrant projection of the base results in the division of said metallic inserts into two relatively small pieces of metal, said inserts being secured together at the ends of their arms in seriatim and adjacent inserts being angularly disposed with respect to each other.

HAROLD E. KIMES.

REFERENCES CITED

The following references are of record in the file of this patent:

UNITED STATES PATENTS

| Number | Name | Date |
|---|---|---|
| 1,740,616 | Midgley | Dec. 24, 1929 |
| 2,006,038 | Yamaki | June 25, 1935 |
| 2,132,614 | Gray | Oct. 11, 1938 |
| 2,479,474 | Crooker | Aug. 16, 1949 |